(12) United States Patent
Albert et al.

(10) Patent No.: US 7,019,299 B2
(45) Date of Patent: Mar. 28, 2006

(54) NUCLEAR CAMERA HOUSING AND METHOD OF CONSTRUCTION

(75) Inventors: Grant Albert, Elgin, IL (US); Way Moy, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 47 days.

(21) Appl. No.: 10/671,284

(22) Filed: Sep. 25, 2003

(65) Prior Publication Data

US 2005/0067573 A1  Mar. 31, 2005

(51) Int. Cl.
*G01T 1/24* (2006.01)
(52) U.S. Cl. ............................... 250/370.01
(58) Field of Classification Search ........ 250/200, 250/496.1, 493.1, 506.1, 507.1, 515.1, 370.01
See application file for complete search history.

(56) References Cited

U.S. PATENT DOCUMENTS 6,635,593 B1 * 10/2003 Kukino et al. ........... 250/506.1
6,682,841 B1 * 1/2004 Armstrong et al. .......... 429/26

\* cited by examiner

*Primary Examiner*—David Porta
*Assistant Examiner*—Marcus Taningco

(57) ABSTRACT

A nuclear camera detector housing assembly is provided and includes an internal housing having a pair of side panels, a front panel interconnecting the pair of side panels, a rear panel interconnecting the pair of side panels, and a top panel operatively associated with the pair of side panels, the front panel and the rear panel, wherein the panels are configured and adapted to shield radiation, and wherein at least one of the panels is independent of the remaining panels. The nuclear camera detector housing further includes an external housing including a multiplicity of walls for supporting the internal housing, and at least one detector disposed within the internal housing for detecting radiation energy incident thereon.

26 Claims, 2 Drawing Sheets

NUCLEAR CAMERA HOUSING AND METHOD OF CONSTRUCTION

BACKGROUND OF THE INVENTION

1. Field of the Invention

The present disclosure relates generally to tomographic imaging and, more particularly to nuclear camera housings for use in nuclear medical imaging and methods of construction thereof.

2. Description of the Background Art

In tomographic imaging, a gamma camera or Anger camera system is employed for imaging of the radiation emitted by a radioactive tracer source injected into a patient. After the tracer has been absorbed into the body of the patient the gamma camera can take a picture of the tissue in question, from outside the body, as an aid to diagnosis.

Such known gamma camera consists of detection elements (e.g., a detector head or imaging plane, imaging electronics and the like), which contains a sodium iodide crystal that absorbs the gamma rays and emits the energy as a flash of light. Coupled to the crystal is an array of photomultiplier tubes that converts the light flashes to electronic pulses. Gamma rays emitted from the imaged organ travel radially outward in all directions. A collimator consisting a multiplicity of parallel holes shields the entire crystal permits the passage of only those rays that are traveling in a direction parallel to the collimator through the crystal. The gamma camera further includes a shielding box surrounding the detection elements. The shielding box is typically made of a radiation blocking material (e.g., lead) configured and dimensioned to block unwanted stray radiation from reaching the detection elements. An issue arises as to the degree of shielding necessary to protect the detection elements from unwanted radiation. In order to sufficiently protect the detection elements from the unwanted radiation, the shielding box surrounding the detection elements needs to be massive. As the level of radiation becomes higher for certain procedures, the degree of shielding provided by the shielding box must be increased which in turn increases the size and/or weight of the shielding box.

In the past, a casting process was typically used to fabricate the shielding box, resulting in a single unitary structure having monolithically formed walls and the like. This casting process consists of casting, pre-machining; pour lead, finish machining and painting. The deficiencies for the manufacturing of the shielding box in these manners are extensive tooling, complex machining, high scrap risk and high storage cost. Firstly, the shielding boxes are integrally cast from lead using combinations of permanent tooling and mechanical housings. The tooling can be complex and costly. Secondly, the casting part can also be costly due to the machining required both before and after casting. The casting for the shielding box can be very massive and difficult to maneuver. Thirdly, the entire shielding box has to be scraped if there is anything wrong with the part. Furthermore, the costs associated with storage and/or transporting of the shielding box can also be high. The higher cost associated with storage of the shielding box stemmed from the relatively larger volume and/or increased space required to store the shielding box, while the higher cost associated with transportation of the shielding box stemmed from the relatively larger volume and relatively increased weight of the shielding box.

Moreover, the ability to reconfigure and/or redesign the monolithically formed shielding box is limited and/or undesirable, in that the entire shielding box would typically need to be removed from the site in order to be worked on. In addition, if a redesign of the shielding box and/or gamma camera was contemplated, it was often the case that the entire shielding box needed to be disposed of and replaced with a new, reconfigured shielding box. Accordingly, an increased amount of scrap resulted from having to dispose of the original shielding box.

Accordingly, in view of the above, the need exists for a shielding box and/or a detector housing that is less expensive to manufacture, is less expensive to store and transport, is simpler to recycle and is more adaptable to re-design as compared to monolithicaally formed shielding boxes.

SUMMARY OF THE INVENTION

Nuclear camera housings for use in nuclear medical imaging and methods of construction thereof are provided. According to one aspect of the present disclosure, a nuclear camera detector housing assembly, includes an internal housing having a pair of side panels, a front panel interconnecting the pair of side panels, a rear panel interconnecting the pair of side panels, and a top panel operatively associated with the pair of side panels, the front panel and the rear panel, wherein the panels are configured and adapted to shield radiation, and wherein at least one of the panels is independent of the remaining panels. The nuclear camera detector housing further includes an external housing including a multiplicity of walls for supporting the internal housing, and at least one detector disposed within the internal housing for detecting radiation energy incident thereon.

In one embodiment, the external housing includes a pair of side walls, a front wall operatively connectable to the pair of side walls, a rear wall operatively connectable to the pair of side walls, and a top wall operatively connectable to the pair of side walls and the front wall, wherein the walls of the external housing support respective panels of the internal housing. It is envisioned that at least one of the walls of the external housing is independent of the remaining walls.

In another embodiment, each panel of the internal housing is mechanically fastenable to a respective wall of the external housing. It is envisioned that each panel of the internal housing can be scewingly fastenable to a respective wall of the external housing. It is further envisioned that each panel of the internal housing is adhered to a respective wall of the external housing.

In yet another embodiment, each side wall panel includes a pair of opposed side terminal edges configured and adapted to sealingly engage with side terminal edges of at least one of the front panel and the rear panel. It is envisioned that the sealing engagement is created by a labyrinth seal formed along each side terminal edge.

It is contemplated that at least one of the panels can be constructed from lead, tungsten, tungsten carbide, tantalum, depleted uranium and/or aluminum.

In another embodiment, the nuclear camera detector housing assembly includes an external housing including a multiplicity of walls, and an internal housing nestable within the outer housing and configured and adapted to provide shielding from radiation. The internal housing includes a pair of side panels securable to a respective wall of the outer housing, a front panel operatively connectable with the pair of side panels and securable to a respective wall of the outer housing, a rear panel operatively connectable with the pair of side panels and securable to a respective wall of the outer housing, and a top panel operatively connectable with the pair of side panels and the front panel and securable to a respective wall of the outer housing.

In one embodiment, the external housing includes a pair of side walls, a front wall operatively connectable between the pair of side walls, and a rear wall operatively connectable between the pair of side walls.

In another embodiment, at least one of the panels of the internal housing can be fabricated from lead, tungsten, tungsten carbide, tantalum, depleted uranium and/or aluminum.

It is envisioned that each panel of the internal housing can be mechanically fastenable to a respective wall of the outer housing. It is further envisioned that each panel of the internal housing can be fastened to a respective wall of the outer housing by means of screws. In addition, the walls of the external housing can be connected to one another by means of fasteners.

It is envisioned that the top wall and the top panel can include at least one aperture formed therein and in registration with one another. Each of the pair of side panels, the front panel and the rear panel can include a flange extending from an upper terminal edge thereof. Each flange has a height which is substantially equal to a thickness of the top panel.

In yet another embodiment, the nuclear camera detector housing assembly further includes at least one detector disposed within the internal housing for detecting radiation energy incident thereon. Each detector can be a solid state detector module. It is envisioned that each detector can be composed of cadmium telluride and/or zinc telluride.

The present disclosure further provides for a method of constructing a nuclear camera detector housing. The method includes the step of providing a nuclear camera detector housing including an internal housing. The internal housing includes a pair of side panels, a front panel interconnecting the pair of side panels, a rear panel interconnecting the pair of side panels, and a top panel operatively associated with the pair of side panels, the front panel and the rear panel. The panels are configured and adapted to shield radiation and at least one of the panels is independent of the remaining panels. The nuclear camera detector housing further includes an external housing including a multiplicity of walls for supporting the internal housing and at least one detector disposed within the internal housing for detecting radiation energy incident thereon.

The method further includes the steps of securing the top, front, back and side panels of the inner housing to respective top, front, back and side walls of the outer housing; securing the front, back and side walls of the external housing to one another; placing the top wall of the external housing atop an upper edge of the front, back and side walls of the external housing; and securing the top wall of the external housing to the upper edge of the front, back and side walls of the external housing.

It is envisioned that each of the panels can be made of lead, tungsten, tungsten carbide, tantalum, depleted uranium and/or aluminum.

It is further envisioned that the adjacent terminal edges of the front, rear and side shielding panels are provided with labyrinth seals.

The nuclear camera detector housing can include a plurality of mechanical fasteners. Accordingly, the top, front, back and side panels of the inner housing can be mechanically fastened to respective top, front, back and side walls of the outer housing. It is envisioned that the mechanical fasteners are screws.

It is further envisioned that at least one of the panels of the internal housing is manufactured by machining.

The above is a brief description of some deficiencies in the prior art and advantages of the present invention. Other features, advantages and embodiments of the invention will be apparent to those skilled in the art from the following description, drawings and claims.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
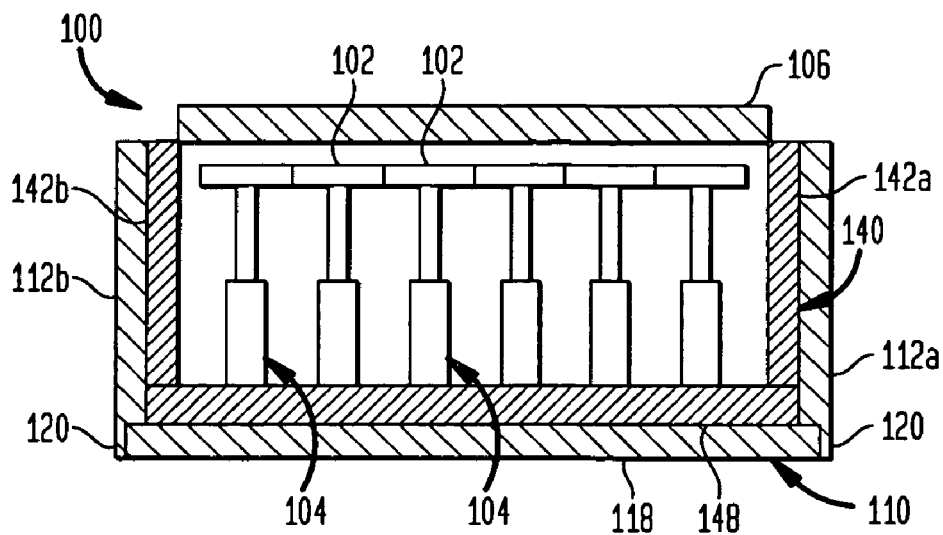
FIG. 1 is a schematic cross-sectional view of a nuclear camera detector housing in accordance with the present disclosure.
Figure 3:
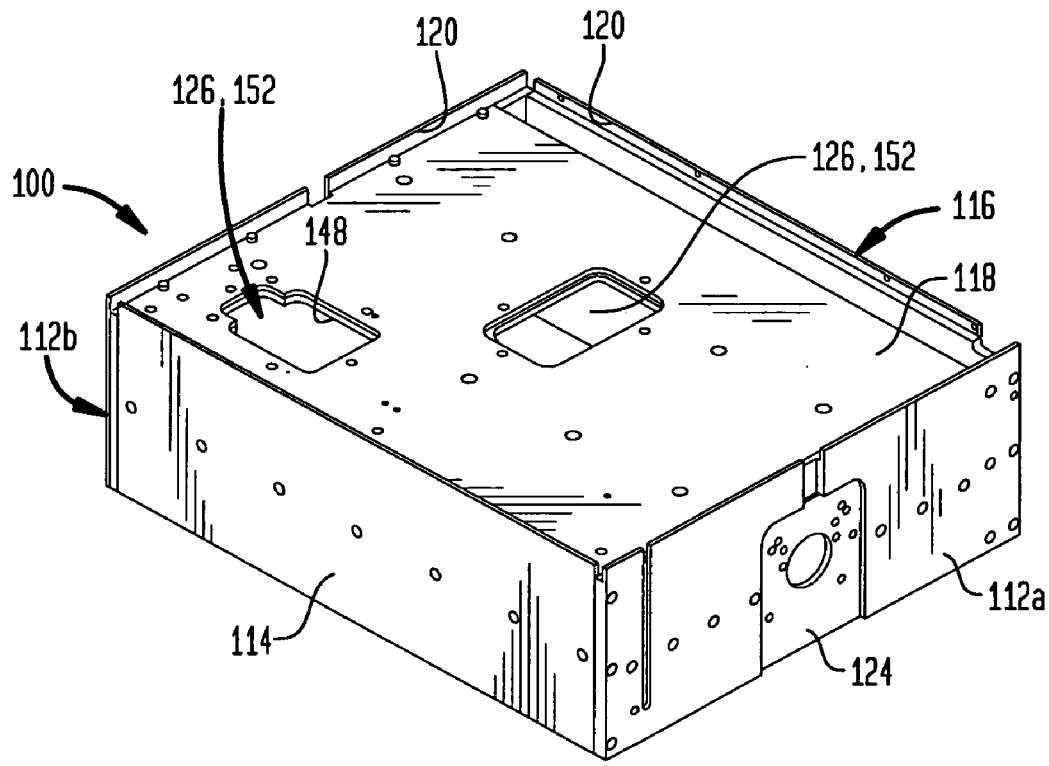
FIG. 3 is a perspective view, with parts assembled, of the nuclear camera detector housing of FIGS. 2–3.
Figure 2:
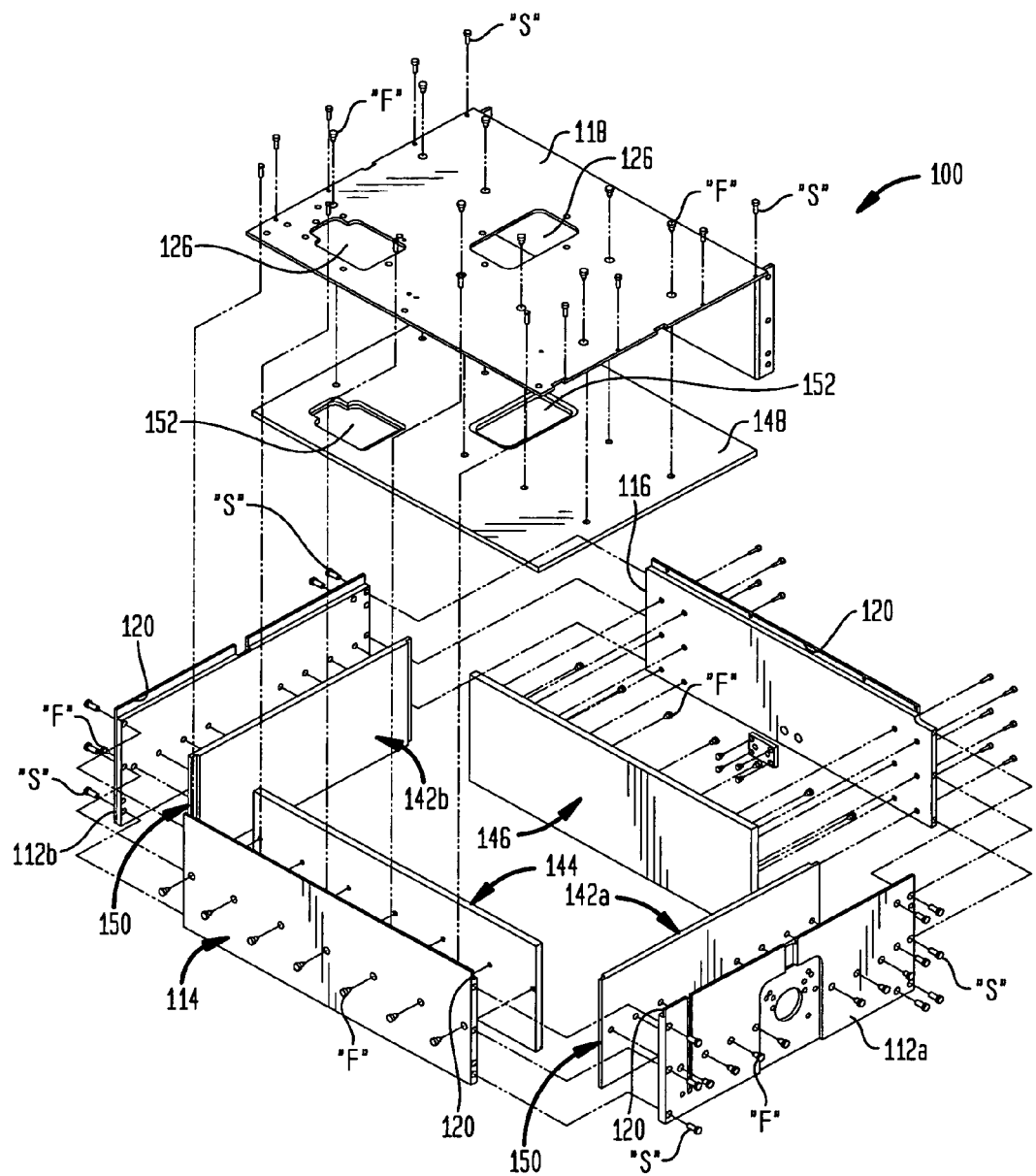
FIG. 2 is a perspective view, with parts separated, of the nuclear camera detector housing of FIG. 1.

Referring now in specific detail to the drawings, wherein like reference numerals identifying similar or identical elements, as shown in FIGS. 1–3, a nuclear camera detector housing, constructed in accordance with the present disclosure, is generally designated as 100. As seen in particular in FIG. 1, detector housing 100 includes a plurality of detectors 102 each positioned within housing 100, with each detector 102 preferably mounted on corresponding supporting structures, such as posts 104. It is envisioned that each of the plurality of detectors 102 is a solid state detector module, such as a semiconductor detector, mounted in a rectilinear array to substantially span the length and breath of housing 100. For example, detectors 102 may be composed of cadmium telluride (CdTe) or cadmium zinc telluride (CZT or CdZnTe), which are on the order of several centimeters in length and width and are pixelated into distinct pixels of approximately 1 mm to 3 mm on each side. Such semiconductor-based detectors operate routinely at temperatures up to 30° C. without excessive thermal noise.

Each detecting surface of detectors 102 is adapted to receive incident un-collimated gamma rays, or alternatively gamma rays collimated by a collimator 106 positioned above detectors 102. Such an array of detectors 102 may be used for detecting low energy gamma rays; for example, gamma rays having energies less than about 200 keV.

With reference to FIGS. 2 and 3, nuclear camera detector housing 100 includes an external housing 110 and an internal housing 140 configured and dimensioned to be positioned substantially entirely within external housing 110. External housing 110 includes a multiplicity of walls each configured and adapted to support a corresponding portion of internal housing 140. In particular, external housing 110 includes a pair of spaced apart, substantially parallel side walls 112a, 112b, a front wall 114 operatively connectable and extending between side walls 112a, 112b, a rear wall 116 operatively connectable and extending between side walls 112a, 112b, and a top wall 118 operatively connectable to at least one of the pair of side walls 112a, 112b, front wall 114 and rear wall 116.

As seen in FIG. 2, the side terminal edges of side walls 112a, 112b, front wall 114 and rear wall 116 are secured to one another via fastening members "S", e.g., screws and the like, in such a manner so as to define an enclosure or similar box-like structure. In addition, the perimeteral edge of top wall 118 is secured to upper edges of side walls 112a, 112b, front wall 114 and/or rear wall 116 via additional fastening members "S", e.g., screws and the like. As seen in FIG. 2, side walls 112a, 112b, front wall 114 and rear wall 116 each includes a flange 120 extending from the upper edge thereof for surrounding and framing-in top wall 118 when top wall 118 is secured to side walls 112a, 112b, front wall 114 and/or rear wall 116. Preferably, flanges 120 have a height substantially equal to a thickness of top wall 118 and/or the combination of top panel 148 and top wall 118.

Preferably, each wall of external housing 110 is fabricated from a rigid, relatively light-weight material, such as, for example, aluminum, sheet metal, plastic and the like or any combination thereof. Desirably, as seen in FIGS. 2 and 3, external housing 110 includes mounting features 124, e.g., recesses, apertures and the like, which facilitate mounting of housing 100 to a nuclear imaging apparatus (not shown).

Unlike the prior art shielding boxes which are cast as one integral structure, as seen in FIGS. 2 and 3, internal housing 140 includes a multiplicity of panels each configured and adapted to be support on a corresponding portion of external housing 110. In particular, internal housing 140 includes a pair of spaced apart, substantially parallel side panels 142a, 142b, respectively, a front panel 144 operatively connectable and extending between side panels 142a, 142b, a rear panel 146 operatively connectable and extending between side panels 142a, 142b, and a top panel 148 operatively connectable to at least one of the pair of side panels 142a, 142b, front panel 144 and rear panel 146. Preferably, each panel of internal housing 140 is fabricated by a machining processes is which the length, width and thickness of each panel are achieved by machining and wherein any surface features, such as, for example, holes, apertures and the like, are machined into the panels.

As seen in detail in FIG. 2, fastening members "F" (e.g., screws) are provided for securing side panels 142a, 142b to respective inner surfaces of side walls 112a, 112b, for securing front panel 144 to the inner surface of front wall 114, for securing rear panel 146 to the inner surface of rear wall 116, and for securing top panel 148 to the inner surface of top wall 118. Accordingly, when the walls of external housing 110 are secured to one another, with the panels of internal housing 140 respectively secured to the walls of external housing 110, the panels define an internal enclosure or box-like structure. While it has been shown and it is preferred that the panels of internal housing 140 are secured to respective walls of external housing 110 with fastening members "F", it is envisioned and within the scope of the present disclosure that other securing means can be provided, such as, for example, adhesive (e.g., glue, epoxy, etc.), clips, clamps, welding and the like.

Preferably, the side terminal edges of side panels 142a, 142b, front panel 144 and rear panel 146 are configured and dimensioned to create a labyrinth-type seal 150 therebetween, when joined to and/or with one another. It is envisioned that labyrinth-type seals 150 are machined along and/or into the side terminal edges of side panels 142a, 142b.

Preferably, each panel of internal housing 140 is fabricated from a high-density material having sufficient mass to block unwanted stray radiation (i.e., able to shield radiation) emanating from the patient and/or the source and reaching detectors 102. Examples of high-density material for the construction of the panels of internal housing 140 include, and are not limited to lead, tungsten, tungsten carbide, tantalum, uranium (depleted uranium and the like) and aluminum. While each panel of internal housing 140 is preferably fabricated from a high-density material, it is envisioned and within the scope of the present disclosure to construct and/or provide an internal housing 140 in which any number of the panels is fabricated from a high-density material.

Individual panels of internal housing 140 can be fabricated having various thicknesses relative to one another. Accordingly, for low energy imaging internal housing 140 can be fabricated with relatively thinner panels as compared to higher energy imaging. Moreover, the relatively thinner panels of internal housing 140 can be individually replaced, as needed and/or desired, with relatively thicker panels when higher energy imaging is conducted. In this manner, significant cost savings are realized in that the entire internal housing 140 does not have to be replaced and that individual panels can be replaced.

As seen in FIGS. 2 and 3, top wall 118 of external housing 110 can be provided with at least one aperture 126 formed therein. In addition, top panel 148 of internal housing 140 can be provided with at least one aperture 152 formed therein, wherein aperture 152 is in registration with aperture 126 when top panel 148 is secured to top wall 118. Apertures 126 and 152 enable passage of connecting and/or control cables/wires (not shown) between detectors 102 and a control unit (not shown).

Nuclear camera detector housing 100 provides an increased degree of flexibility over conventional housings in that the type and/or degree of shielding therewithin can be readily tailored to the particular procedure being performed. For example, as described above, the individual panels of internal housing 140 can be interchanged with thicker or thinner panels or panels having varying thickness, and the panels can be interchanged with panels of differing material.

Internal housing 140 offers numerous advantages over prior shielding boxes, such as, for example, the ability to undergo more rapid design changes; a reduction in the amount of scrap created during the manufacturing process in that if an error should occur during the manufacture of the shielding box the entire structure needs to be discarded, however, if an error occurs during the manufacture of internal housing 140, only the individual panel(s) need to be discarded; an improved cycle time due to the elimination of the casting and cool-down phases in the manufacture of the shielding box; use of fasteners improves part cycle time and facilitates part disassembly for ISO 14000 compliant recycling; and minimizes the overall weight variation of the nuclear camera by the use of closely toleranced machined panels.

Various embodiments of the present invention have been described above having a number of advantageous over previous housings and their methods of construction. One advantage is the facilitation of rapid design changes by the use of use of small, machined components. Another advantage is the reduction in scrap due the ability to re-work individual components. Yet another advantage is the improved cycle time due to the elimination of the casting and cool-down phases in cast tub process. Yet another advantage is the improved part cycle time due to the use of mechanical fasteners. Yet another advantage is the facilitation of part disassembly for ISO 14000 compliant recycling due to the use of mechanical fasteners. Yet another advantage is the wider pool of potential suppliers due to use of simple machined and sheet metal components. And yet another advantage is the minimization of the overall weight variation of the enclosure by the use of close tolerance machined plates. Yet another advantage is the reduction of overall cost through the elimination of multiple machine set ups and processes.

Although the present invention has been described in accordance with the embodiments shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A nuclear camera detector housing assembly, comprising:
    an internal housing including:
        a pair of side panels;
        a front panel interconnecting the pair of side panels;
        a rear panel interconnecting the pair of side panels; and
        a top panel operatively associated with the pair of side panels, the front panel and the rear panel, wherein the panels are configured and adapted to shield radiation, and wherein at least one of the panels is independent of the remaining panels;
    an external housing including a multiplicity of walls for supporting the internal housing; and
    at least one detector disposed within the internal housing for detecting radiation energy incident thereon.

2. The nuclear camera detector housing assembly of claim 1, wherein the external housing comprises:
    a pair of side walls;
    a front wall operatively connectable to the pair of side walls;
    a rear wall operatively connectable to the pair of side walls; and
    a top wall operatively connectable to the pair of side walls and the front wall, wherein the walls of the external housing support respective panels of the internal housing.

3. The nuclear camera detector housing assembly of claim 2, wherein at least one of the walls of the external housing is independent of the remaining walls.

4. The nuclear camera detector housing assembly of claim 1, wherein each panel of the internal housing is mechanically fastenable to a respective wall of the external housing.

5. The nuclear camera detector housing assembly of claim 1, wherein each panel of the internal housing are connected to a respective wall of the external housing by at least one fastener.

6. The nuclear camera detector housing assembly of claim 1, wherein each panel of the internal housing is adhered to a respective wall of the external housing.

7. The nuclear camera detector housing assembly of claim 1, wherein each side wall panel includes a pair of opposed side terminal edges configured and adapted to sealingly engage with side terminal edges of at least one of the front panel and the rear panel.

8. The nuclear camera detector housing assembly of claim 7, wherein the sealing engagement is created by a labyrinth seal formed along each side terminal edge.

9. The nuclear camera detector housing assembly of claim 1, wherein at least one of the panels is constructed from lead, tungsten, tungsten carbide, tantalum, depleted uranium or aluminum.

10. A nuclear camera detector housing assembly, comprising:
    an external housing including a multiplicity of rigid walls and a top wall; and
    an internal housing nestable within the external housing and configured and adapted to provide shielding from radiation, the internal housing including:
        a pair of side panels securable to a respective wall of the external housing;
        a front panel operatively connectable with the pair of side panels and securable to a respective wall of the external housing;
        a rear panel operatively connectable with the pair of side panels and securable to a respective wall of the external housing; and
        a top panel operatively connectable with the pair of side panels and the front panel and securable to a respective wall of the external housing; wherein the top wall and the top panel each include at least one aperture formed therein and in registration with one another.

11. The nuclear camera detector housing assembly of claim 10, wherein the external housing comprises:
    a pair of side walls;
    a front wall operatively connectable between the pair of side walls; and
    a rear wall operatively connectable between the pair of side walls.

12. The nuclear camera detector housing assembly of claim 10, wherein at least one of the panels of the internal housing is fabricated from at least one of lead, tungsten, tungsten carbide, tantalum, depleted uranium and aluminum.

13. The nuclear camera detector housing assembly of claim 10, wherein each panel of the internal housing is mechanically fastenable to a respective wall of the external housing.

14. The nuclear camera detector housing assembly of claim 13, wherein each panel of the internal housing is connected to a respective wall of the external housing by at least one fastener.

15. The nuclear camera detector housing assembly of claim 13, wherein the walls of the external housing are connected to one another by at least one fastener.

16. The nuclear camera detector housing assembly of claim 15, wherein each of the pair of side panels, the front panel and the rear panel includes a flange extending from an upper terminal edge thereof.

17. The nuclear camera detector housing assembly of claim 16, wherein each flange has a height which is substantially equal to a thickness of the top panel.

18. A nuclear camera detector housing assembly comprising:
    an external housing including a multiplicity of walls;
    an internal housing nestable within the external housing and configured and adapted to provide shielding from radiation, the internal housing including:
        a pair of side panels securable to a respective wall of the external housing;
        a front panel operatively connectable with the pair of side panels and securable to a respective wall of the external housing;

a rear panel operatively connectable with the pair of side panels and securable to a respective wall of the external housing; and a top panel operatively connectable with the pair of side panels and the front panel and securable to a respective wall of the external housing; and at least one detector disposed within the internal housing for detecting radiation energy incident thereon.

19. The nuclear camera detector housing assembly of claim 18, wherein each detector is a solid state detector module.

20. The nuclear camera detector housing assembly of claim 19, wherein each detector is composed of at least one of cadmium telluride and zinc telluride.

21. A method of constructing a nuclear camera detector housing, comprising the steps of:
providing a nuclear camera detector housing including:
an internal housing including:
a pair of side panels;
a front panel interconnecting the pair of side panels;
a rear panel interconnecting the pair of side panels; and
a top panel operatively associated with the pair of side panels, the front panel and the rear panel, wherein the panels are configured and adapted to shield radiation, and wherein at least one of the panels is independent of the remaining panels;
an external housing including a multiplicity of walls for supporting the internal housing; and
at least one detector disposed within the internal housing for detecting radiation energy incident thereon;
securing the top, front, back and side panels of the inner housing to respective top, front, back and side walls of the outer housing;

securing the front, back and side walls of the external housing to one another;

placing the top wall of the external housing atop an upper edge of the front, back and side walls of the external housing; and securing the top wall of the external housing to the upper edge of the front, back and side walls of the external housing.

22. The method according to claim 21, wherein each of the panels is made of at least one of lead, tungsten, tungsten carbide, tantalum, depleted uranium and aluminum.

23. The method according to claim 22, wherein the adjacent terminal edges of the front, rear and side shielding panels are provided with labyrinth seals.

24. The method according to claim 22, wherein the nuclear camera detector housing includes a plurality of mechanical fasteners, and wherein the step of securing the top, front, back and side panels of the inner housing to respective top, front, back and side walls of the outer housing includes mechanically fastening the top, front, back and side panels of the inner housing to respective top, front, back and side walls of the outer housing.

25. The method according to claim 24, wherein the mechanical fasteners are screws.

26. The method according to claim 22, wherein at least one of the panels of the internal housing is manufactured by machining.

* * * * *